(12) United States Patent
Ikeda et al.

(10) Patent No.: US 6,496,391 B1
(45) Date of Patent: Dec. 17, 2002

(54) POWER SUPPLY UNIT UTILIZING A CURRENT TRANSFORMER

(75) Inventors: Ikuo Ikeda, Tokyo (JP); Takayuki Hattori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/045,032

(22) Filed: Jan. 15, 2002

(30) Foreign Application Priority Data

Aug. 7, 2001 (JP) ........................................ 2001-239876

(51) Int. Cl.[7] ............................................. H02M 3/156
(52) U.S. Cl. ............................. 363/53; 363/82; 363/90
(58) Field of Search .............................. 363/52, 53, 81, 363/82, 89, 90

(56) References Cited

U.S. PATENT DOCUMENTS

| | | | | |
|---|---|---|---|---|
| 3,641,421 A | * | 2/1972 | Graf et al. | 363/136 |
| 3,742,302 A | * | 6/1973 | Neill | 361/22 |
| 4,383,293 A | * | 5/1983 | Randall | 363/17 |
| 4,964,029 A | * | 10/1990 | Severinsky et al. | 323/224 |
| 4,974,141 A | * | 11/1990 | Severinsky et al. | 323/224 |
| 5,428,286 A | * | 6/1995 | Kha | 323/222 |
| 5,559,684 A | * | 9/1996 | Ohms et al. | 363/101 |
| 5,777,864 A | * | 7/1998 | Seong et al. | 323/217 |
| 5,982,136 A | * | 11/1999 | Pelly | 318/801 |
| 6,320,772 B1 | * | 11/2001 | Doyama et al. | 363/127 |

FOREIGN PATENT DOCUMENTS

JP         6-58960         3/1994

* cited by examiner

*Primary Examiner*—Bao Q. Vu
(74) *Attorney, Agent, or Firm*—Leydig, Voit & Mayer, Ltd.

(57) ABSTRACT

A power supply unit for use in a measuring instrument at a plant. An output from a current transformer mounted on a power supply line is controlled so that the range of a primary current producing a stable output is increased. The invention includes a current transformer mounted on a cable for providing power to an electric motor, and a power supply unit. The power supply unit includes a rectifier circuit, a short circuit, a reverse current inhibit element, a condenser, a voltage watching circuit, and a constant voltage element. The voltage watching circuit outputs a command signal when the voltage of the condenser exceeds a first level and connects the short circuit 32.

7 Claims, 10 Drawing Sheets

(PRIOR ART)

Fig. 11

(PRIOR ART)

Fig. 12

POWER SUPPLY UNIT UTILIZING A CURRENT TRANSFORMER

BACKGROUND OF THE INVENTION

1. Technical Field

The present invention relates to a power supply unit that supplies power to a measuring instrument for measuring various data of plant equipment or a watching device at a site where various plants are located.

2. Background Art

In a large-scale plant using electrical equipment, such as electric motors or transformers, for example, various plant facilities, such as power plants or water treatment plants, and the like, it is essential to secure reliability of the plant and improve rate of operation. That is, in such a large-scale plant, data of the set-up electrical equipment is collected to serve as information concerning operation, and operating conditions are subject to watch to immediately cope with anything abnormal that has been detected.

For such purposes, it is a recent trend to introduce an equipment condition-watching device for watching the conditions of the equipment so that various data are measured from the electric-power equipment, electrical equipment and the like installed in the plant. The data are then observed, and conditions of the equipment are watched or analyzed on the basis of the contents thereof.

The equipment condition watching device for watching the conditions of the equipment is directed not only to machine/electrical equipment such as electric motors, electric generators, pumps, valves, and piping but also to calculators and printed boards built into the equipment and measuring instrument.

There have been conventionally two types of such equipment condition watching devices for watching the conditions of the equipment. One is a device that is located close to the electrical equipment to be watched. This device measures data of the equipment to be watched regularly or at arbitrary times, thereby watching the conditions of the equipment at the time of measurement in substitution for a patrol carried out by an operator in the plant (the device is hereinafter referred to as a detecting device). The other is a device that measures data of the equipment to be watched on line at all times via a plurality of the detecting devices, thereby watching the conditions at all times (the device is hereinafter referred to as a central control device). The detecting device and the central control device are both located, e.g., on the site of the same plant. However, several detecting devices are widely placed in a scattered manner in the so-called site, while the central control device is located in a centralized manner in the so-called control building or the like. Both of them are located within a relatively short distance from each other. As a result, in order to transmit the collected data, a method of transmission without construction of a power line such as radio system can be easily employed.

Now, in order to operate the detecting device, a power supply is necessary as a matter of course. However, most of the detecting devices usually belong to a category of so-called light electric appliances and are operated at an extremely low voltage and a very small current. On the other hand, there is a lot of electrical equipment to be watched which can be operated at a high voltage and a large current. Therefore, it is often the case that although the device to be watched is an electrical equipment, an appropriate power supply for the detecting device is not available at the site of installation.

As a matter of course, it may be said possible to obtain a low voltage from the electrical equipment to be watched by a well-known method such as using a voltage-reducing resistance or transformer. Actually, however, for the purpose of securing voltage endurance, cost effectiveness is exceedingly bad, and moreover it is difficult to prevent invasion of a surge voltage resulting in deficiency in practical use. Thus, to provide a power supply, it becomes necessary to lay a power supply cable additionally as a power supply for measurement, or to employ a battery; otherwise electric power must be generated at the site utilizing, e.g., a solar battery. However, in order to lay and connect the power supply cable to the detecting devices widely scattered in the plant, a large cost is required. Moreover, the battery may bring about the trouble of maintenance or replacement. As for the solar battery, battery life is restricted, and a place for installation is so restricted that the solar battery cannot be used in this field of art.

As a method to solve these problems, Japanese Patent Publication (unexamined) No. Hei. 6-58960 proposed a power supply unit.

Figure 9:
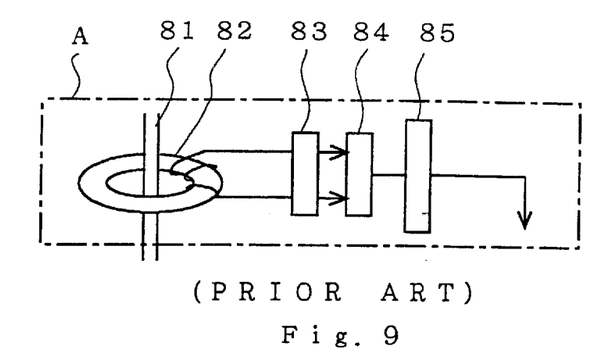
FIG. 9 is a schematic diagram-showing an arrangement of a conventional power supply unit.
Figure 10:
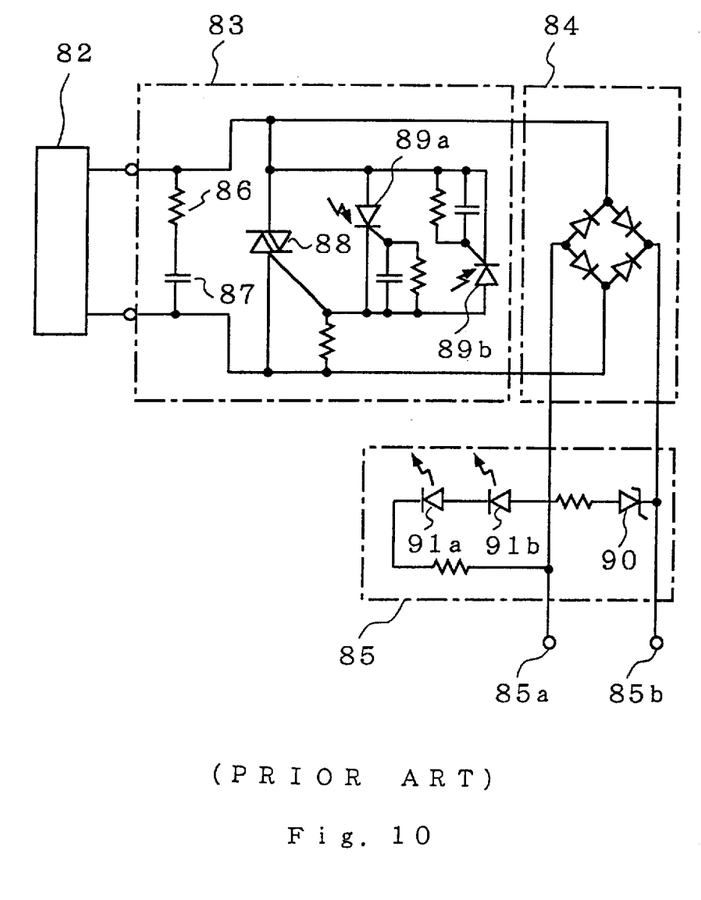
FIG. 10 is a circuit diagram of FIG. 9.

FIG. 9 is a schematic diagram of a known power supply unit which is similar to that disclosed in the above-mentioned gazette and which obtains a power via a current transformer used as a power supply for watching a transmission line. FIG. 10 is specific diagram of such a circuit. In FIG. 9, reference symbol A designates a power supply unit. Reference numeral 81 designates a power line such as a distribution line. Numeral 82 designates a current transformer taking a power supply power from the power line 81 in a non-contact manner. Numeral 83 designates an AC current control circuit. Numeral 84 designates a rectifier circuit. Numeral 85 designates a voltage detection/control circuit.

The power taken from the current transformer 82 needs to be supplied as a stable power supply. This power control means is comprised of the AC current control circuit 83, the rectifier circuit 84 and the voltage detection/control circuit 85 in FIG. 9, and a circuitry thereof is specifically shown in FIG. 11. In the drawing, a resistance 86 in the AC current control circuit 83 and a condenser 87 form a protective circuit for protection when an abnormal voltage such as surge is generated. Numeral 88 designates a triac. Numerals 89a, 89b are phototransistors. The rectifier circuit 84 is a full-wave rectifier circuit, and an output thereof is connected to circuits such as constant voltage diode 90 and light-emitting diodes 91a, 91b for protection against over voltage in the voltage detection/control circuit 85. Thus, when a DC output from the rectifier circuit 84 exceeds an inverse voltage of the constant voltage diode 90, a current flows through the light-emitting diodes 91a, 91b to cause them to emit light. By means of these signals of light, the phototransistors 89a, 89b are operated to feed a current through a gate of the triac 88. By this current, an anode and a cathode are brought into short circuit causing an input of AC to be interrupted. However, the triac 88 will be recovered by means of zero cross point of AC and will supply power up to a next over voltage.

Figure 11:
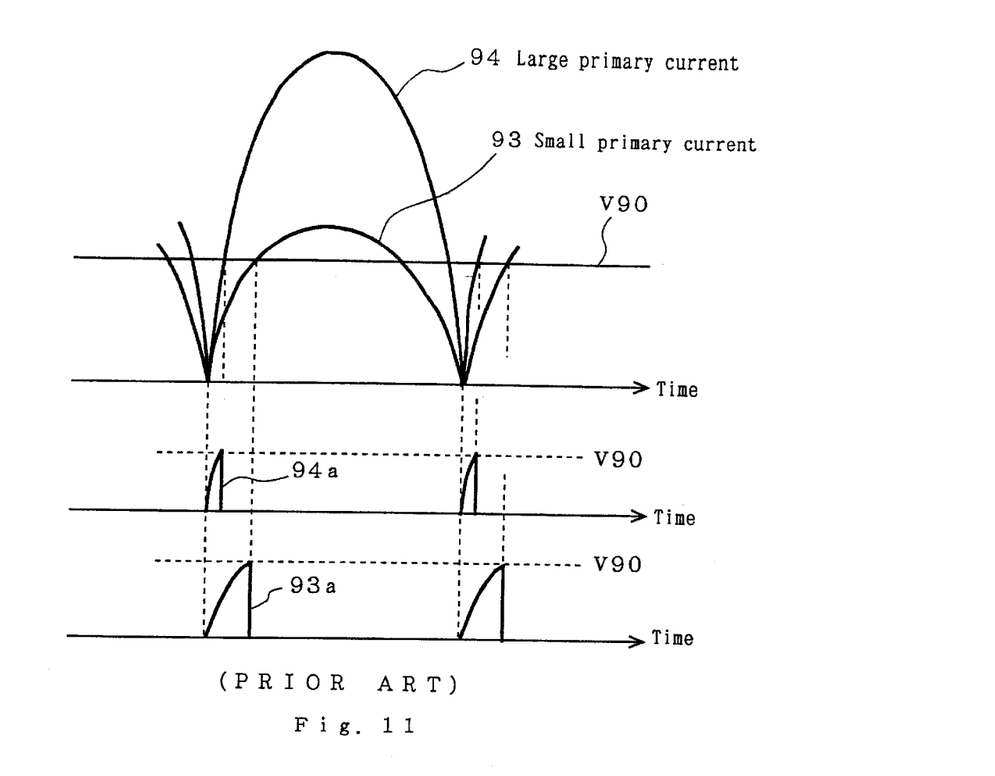
FIG. 11 is a waveform chart for explaining operation of the circuit of FIG. 10.
Figure 12:
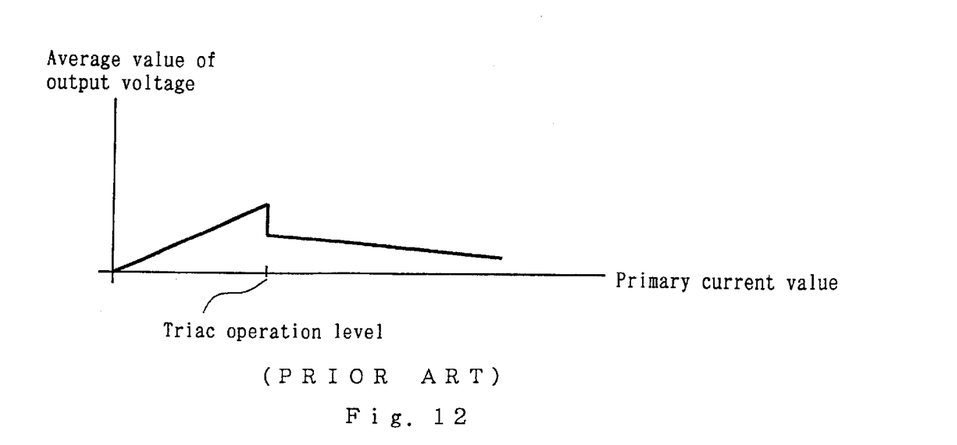
FIG. 12 is a characteristic chart for explaining a characteristic of the circuit in FIG. 10.

The conventional power supply unit is arranged as mentioned above so as to control Ac. Therefore, even if the primary current varies, any over voltage is not outputted. However, the voltage detection/control circuit 85 operates at the moment when a value of a voltage waveform reaches to a voltage V90 of the constant voltage diode 90, and the AC control circuit 83 operates so as to surpass the output voltage. Therefore, as shown in FIG. 11, as to the output waveform, duration of the waveform becomes smaller as the primary current augments. As a result, as shown in FIG. 12, an average value of the output voltage shows such a characteristic as to be lowered as the primary current augments, above a level of the operation of the triac. In FIG. 11, numeral 93 is a waveform of the output voltage of the transformer 82 when the primary current is small. Numeral 94 is a waveform of the output voltage of the transformer 82 when the primary current is large. Numeral 93a is a waveform of the output voltage after operating the triac 88 on the waveform 93 thereby interrupting the waveform. Numeral 94a is a wave form of the output voltage after operating the triac 88 on the waveform 94 thereby interrupting the waveform.

Therefore, the range of the primary current magnitude sufficient for obtaining a stable voltage output is narrow. Even when employing a circuit for stabilizing voltage as post-treatment, the voltage cannot be perfectly restrained from fluctuating. After all, performance as a power supply of an instrumentation circuit for carrying out a precise measurement is not sufficiently exhibited, and, moreover, such a conventional power supply unit cannot be used for any power line subject to a load, such as an electric motor of which current fluctuates significantly.

In the conventional power supply unit having the above-mentioned arrangement, although cable laying is not required, a problem exists in that a range of the primary current in which a stable output voltage can be obtained is exceedingly narrow, and, moreover, another problem exists in that it is difficult to obtain a stable voltage as a power supply for instrumentation.

SUMMARY OF THE INVENTION

The present invention was made to solve the above-discussed problems and has an object of providing a power supply unit that operates stably over wide range of variation in primary current and has a stability of such a level as to be capable of driving a computer at the site, as a power supply of a precise measuring instrument even in the case that the source of the primary current varies over a wide range, for example, in case of an electric motor.

A power supply unit according to the present invention comprises:

a current transformer mounted on a power supply line of an electrical equipment;

a rectifier circuit connected to an output side of the mentioned current transformer;

a condenser connected via a reverse current inhibit element to an output terminal of the mentioned rectifier circuit and charged with an output current from the mentioned current transformer;

a voltage watching circuit for outputting a command signal when a voltage at both terminals of the mentioned condenser is over a predetermined first voltage, and for stopping the mentioned command signal when the mentioned voltage at both terminals is below a predetermined second voltage; and a switching circuit for connecting a resistor to the output terminal of the mentioned rectifier circuit in response to the mentioned command signal, and reducing a current for charging the mentioned condenser.

As a result, a voltage can be taken from the power supply line in a non-contact manner, and also a stable voltage can be taken with respect to a wide range of variation in the primary current.

The power supply unit according to the invention further comprises a constant voltage regulator for obtaining a predetermined constant voltage output from the voltage at both terminals of the mentioned condenser.

As a result, an extremely stable voltage can be outputted.

In the power supply unit according to the invention, it is preferable that a plurality of mentioned switching circuits and a plurality of mentioned voltage watching circuits are provided respectively, and the mentioned first predetermined voltage set at each of the mentioned plurality of voltage watching circuits is different from each other.

As a result, a stable voltage can be outputted in a wider range of variation in the primary current.

In the power supply unit according to the invention, it is preferable that the mentioned current transformer is a current transformer including a core surrounding the mentioned power supply line and a secondary winding wound around the mentioned core.

As a result, a power supply can be taken in a non-contact manner.

In the power supply unit according to the invention, it is preferable that the mentioned core is composed of a saturable reactor being magnetic-saturated in one cycle of a primary current of the mentioned current transformer.

As a result, a stable output voltage can be obtained in the wider range of variation in the primary current.

The power supply unit according to the invention further comprises a resistor connected in parallel with a secondary winding of the mentioned current transformer; and wherein the mentioned rectifier circuit is a voltage multiplying rectifier or Cockcroft-Walton type step up circuit.

As a result, a stable output voltage can be obtained even in the range of low primary current.

In the power supply unit according to the invention, it is preferable that the mentioned first predetermined voltage is set to be close to a maximum voltage at which the mentioned constant voltage regulator can be operated, and that the mentioned second predetermined voltage is set to be close to a minimum voltage at which the mentioned constant voltage regulator can be operated.

As a result, a stable constant voltage output can be obtained.

DESCRIPTION OF THE PREFERRED EMBODIMENTS

Embodiment 1

Figure 1:
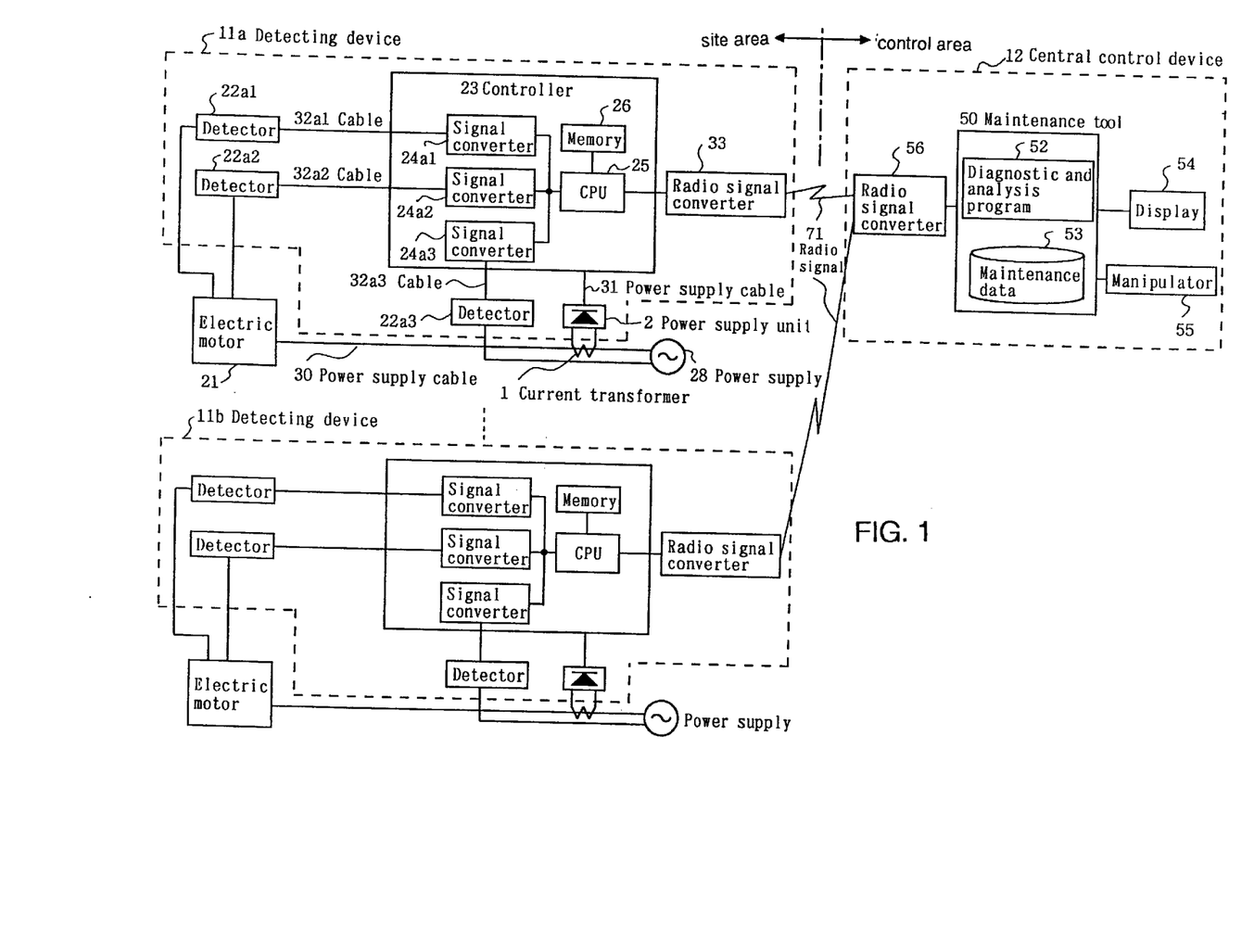
FIG. 1 is a diagram for explaining an operating condition of a power supply unit in a plant according to the present invention.
Figure 2:
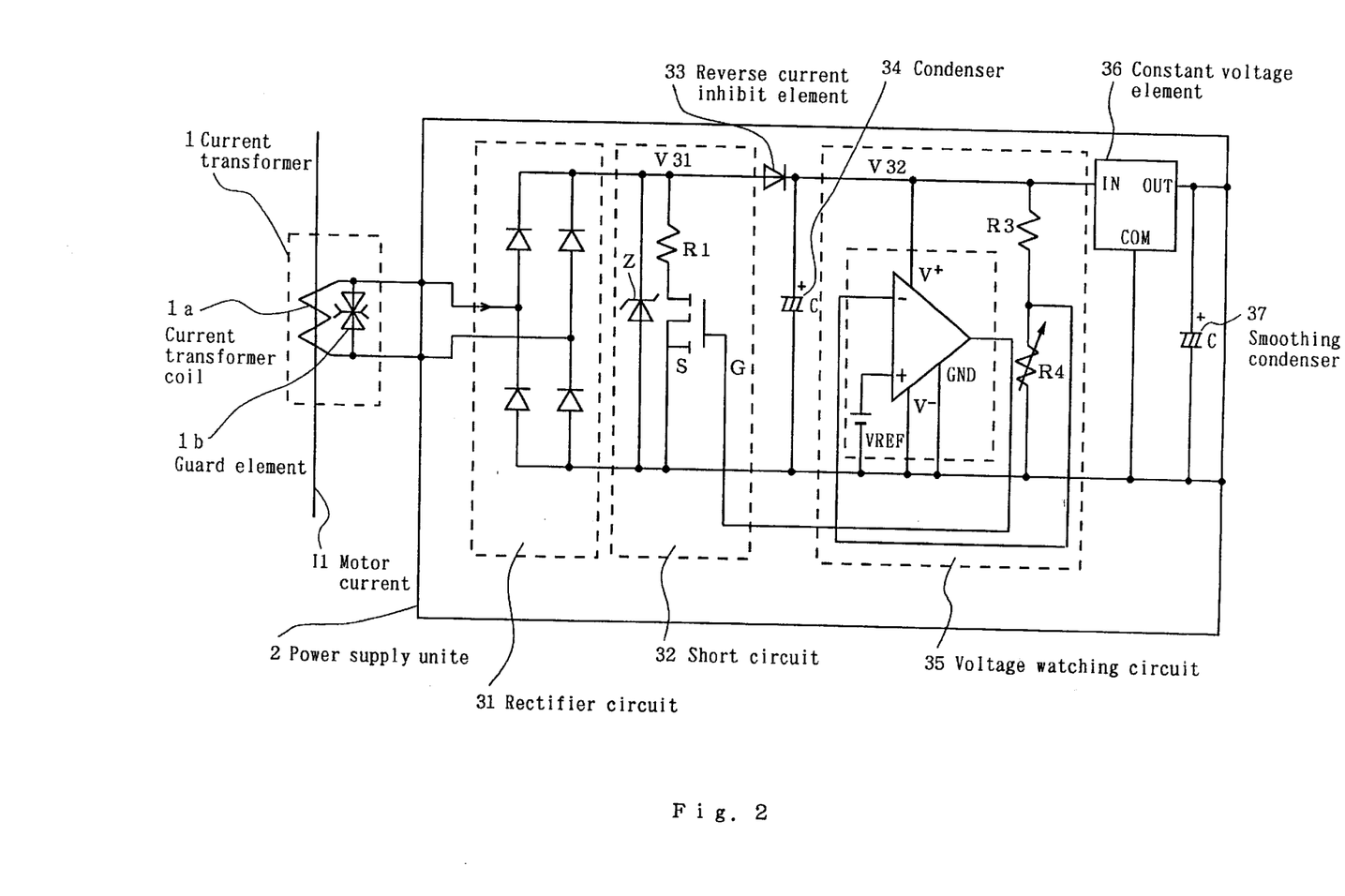
FIG. 2 is a circuit diagram of the power supply unit according to a first preferred embodiment.

FIG. 1 shows an arrangement of a detecting device electrically fed from a non-contact power supply unit according to a first preferred embodiment of the present invention together with arrangement of a central control device connected thereto. FIG. 2 shows a circuit of the non-contact power supply unit 2 of FIG. 1.

In FIG. 1, reference numerals 11a, 11b (dotted lines) designate detecting devices respectively installed in the site area of a certain plant not shown, and numeral 12 designates a central control device 12 installed in the control area of the same plant. Further, for the convenience of explanation, numerals 71 designate radio waves 71 for providing a connection between the detecting devices 11a, 11b and the central control device 12.

As the detecting devices 11a and 11b are of the same arrangement and therefore only the detecting device 11a will be hereinafter described. Shown in FIG. 1 are the detecting device 11a installed at not less than one site areas, and the central control device 12 installed in a control area apart from the site area by a certain distance, for example, several hundred meters.

In the site area, there is an electric motor 21 fed via a power supply cable 30 from a power supply 28, and on this electric motor 21 or the power supply cable 30, the detecting device 11a is mounted via a current transformer 1.

The detecting device 11a includes: a plurality of detectors 22a1, 22a2, 22a3; a plurality of cables 32a1, 32a2, 32a3 for transmitting detected signals from these detectors; a plurality of signal converters 24a1, 24a2, 24a3 for converting the transmitted signals into digital signals capable of being processed in CPU; a CPU 25 for conducting a command of processing the signals; a memory 26 for storing the signals or commands; and a radio signal converter 33 for converting the signals into the signals in a communication format in order to transmit them to the central control device 12.

Furthermore, the signal converter 24a1, 24a2, 24a3, the CPU 25 and the memory 26 are housed in a controller 23. The controller 23 is fed via the power source cable 31 from the power supply unit 2. When there are a plurality of the site areas, the other site area 11b is arranged in the same manner.

An operation of the non-contact power supply unit according to this embodiment is hereinafter described with reference to FIGS. 1, 2, 3 and 4.

In the proximity of any device to be a watched such as the electric motor 21 in FIG. 1, the power supply unit 2 for processing at site takes a secondary induced current to a coil 1a of the current transformer 1 mounted on the power supply cable 30 of the mentioned electric motor. The taken secondary induced current is rectified at the rectifier circuit 31 to be converted into a DC low voltage and supplied to the controller 23, etc.

The current transformer 1 is comprised of a current transformer coil 1a for outputting a secondary current and a guard element 1b for preventing that a high voltage is induced to a terminal of the current transformer coil 1a in the case of the terminal being erroneously opened. As long as the circuit for feeding the secondary induced current is normally connected, the guard element 1b is not operated and the secondary induced current is supplied to the rectifier circuit 31.

The rectifier circuit 31 having received the secondary induced current converts it into a DC voltage V31. However, when a value of the secondary induced current is larger than a total amount of current consumed in circuits disposed downstream (including not only the consumption in the controller 23 but also some amount of current consumed in each of the parts in the interior of the power supply unit 2), the secondary induced current passes through a reverse current inhibit element 33 and stored as power in a condenser 34 to be a voltage source. At this time, a voltage V32 at both terminals of the condenser 34 rises in such a rate as to satisfy the condition of being charged from a constant current source that outputs a current of (output current from the current transformer 1—the mentioned consumed current). Then, after converted into target voltage at a constant voltage element 36 (i.e., a constant voltage regulator in the invention), the voltage V32 is smoothed at a smoothing condenser 37 and supplied to the controller 32, etc.

The voltage V32 at both terminals of the condenser 34 increases and decreases according to fluctuation in load current from the controller 23, etc. and fluctuation in output current from the current transformer 1, i.e., increase and decrease in current from the electric motor 21. Therefore, the voltage V32 of the condenser 34 is detected at a voltage watching circuit 35. When the voltage V32 is charged up to an undesirably high voltage of being over an input endurance voltage (hereinafter referred to as V2) of the constant voltage element 36, a command signal is outputted from the voltage watching circuit 35 to cause a short circuit 32 (the switching circuit in the invention) to be in a conductive state. Thus, the output of the rectifier circuit 31 is bypassed to a resistance R1 thereby an output voltage V31 of the rectifier being lowered. As a result, the condenser 34 will not be charged and the voltage at both terminals V32 comes to be lowered corresponding to power consumption at the controller.

Under the operation of the short circuit 32, the power at the condenser 34 is inhibited by means of the reverse current inhibit element 33, whereby there is no current flow back to the short circuit 32. As a result of the controlled 23 continuing to operate under the action of the short circuit 32, the power in the condenser 34 is consumed, and the voltage V32 comes to drop. When the voltage V32 has dropped to a lower limit value (hereinafter referred to as V1) of the input voltage of the constant voltage element 36, the voltage watching circuit 35 resets the short-circuit state of the short circuit 32 and starts again charging the condenser 34. The operating voltage by which the voltage watching circuit 35 outputs a command signal is hereinafter referred to as a first predetermined voltage. Further, the operating voltage for releasing the short-circuited state of the short circuit 32 is hereinafter referred to as a second predetermined voltage.

Figure 3A:
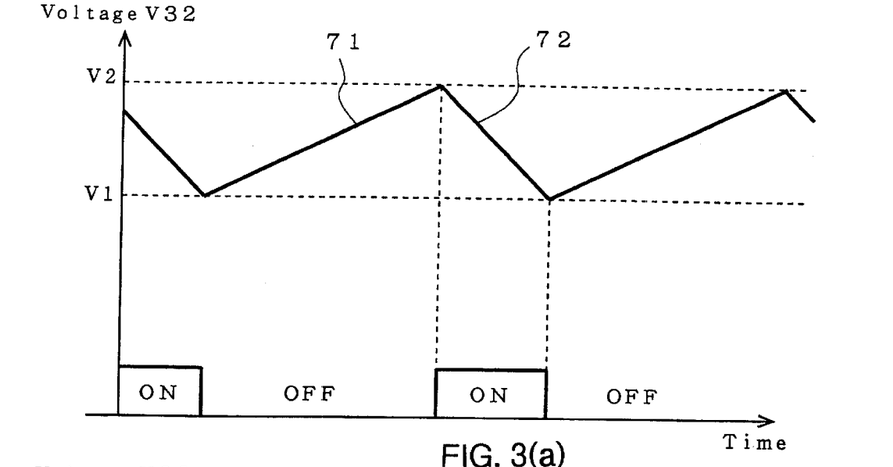
FIGS. 3(a) and 3(b) are waveform charts for explaining an operation of the circuit in FIG. 2.
Figure 3B:
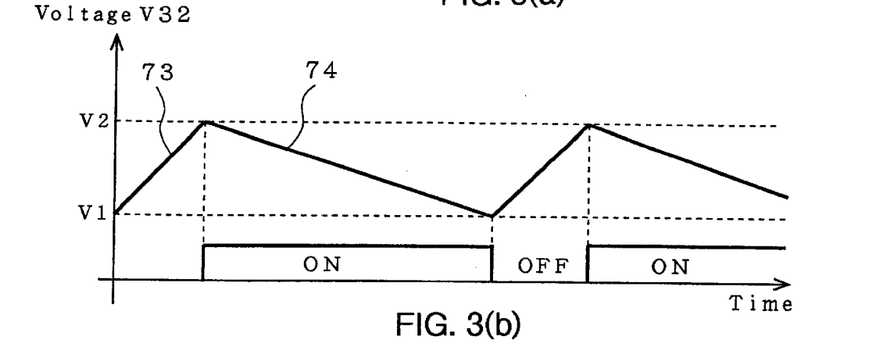

For easy understanding, FIGS. 3(a) and (b) show a relation between a time-sequential variation of the voltage V32 of the condenser 34 and operation of the short circuit 32. FIG. 3(a) is the case of a small primary current wherein inclination of a voltage rising line 71 is moderate while inclination of a voltage lowering line 72 is steep. FIG. 3(b) shows the case of a large primary current wherein inclination of the voltage rising line 73 is steep while the inclination of the voltage lowering line 74 is moderate. In the drawings, ON or OFF indicates on or off state of the short circuit. As a matter of course, a larger capacitance of the condenser 34 enables to make a period of ON/OFF longer.

Figure 4:
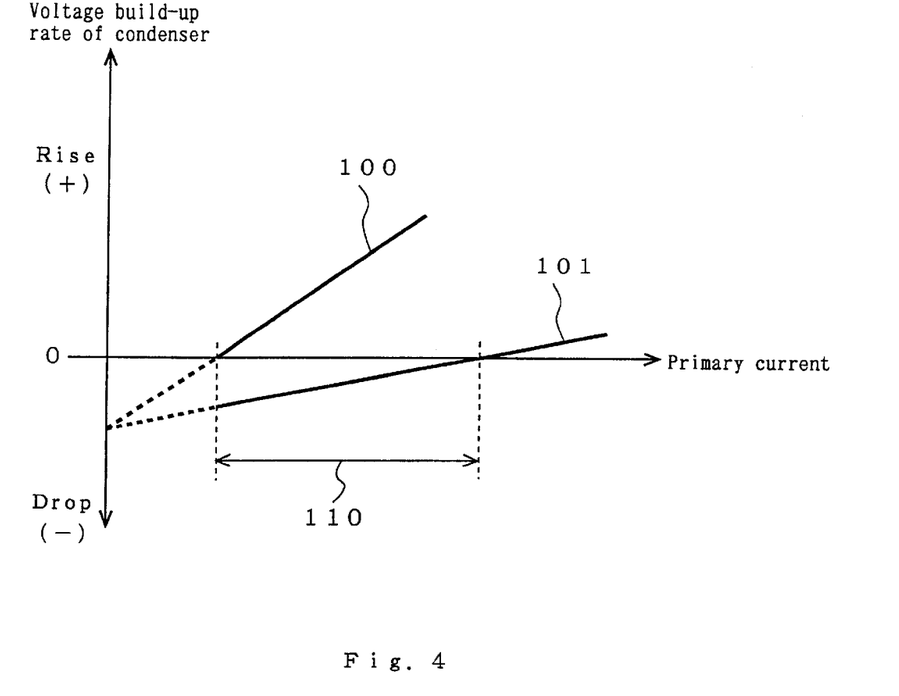
FIG. 4 is a characteristic chart for explaining an operating characteristic of the circuit in FIG. 2.

For easier understanding, FIG. 4 shows variation in voltage build-up rate at both terminals of the condenser 34 with respect to the value of the primary current. In the drawing, numeral 100 indicates a characteristic of the voltage build-up rate of the condenser 34 under the condition that the short circuit 32 is not operated. Numeral 101 indicates the rate under the condition that the short circuit 32 is operated. However, in FIG. 4, for convenience of explanation, a value of current consumed at the controller, etc. is supposed to be constant. Note that the primary current of this power supply unit can operate within a range (indicated by numeral 110 in the drawing) in which the voltage build-up rate of the condenser 34 is plus (positive region) under the condition that the short circuit 32 is not operated at all (solid line 100 in the drawing), and the voltage build-up rate of the condenser 34 is minus (negative region) under the condition that the short circuit 32 is operated (solid line 101).

In this power supply unit, when a value of the primary current of the current transformer 1 becomes smaller and the voltage V32 of the condenser 34 can not rise despite the short circuit 32 being off, a predetermined voltage cannot be outputted in a short time, resulting in stop of the operation. Additionally, when the primary current becomes larger than predicted, rise of the voltage V32 cannot be stopped even if the short circuit 32 is on.

The operable range 101 can be expressed as follows:

(Consumed current+$R1$ bypass current)>transformer output current>consumed current The power supply unit is operable with this range 101.

If the state in which the output current from the transformer exceeds (consumed current+R 1 bypass current) may continue for a long time, the voltage at both terminals of the condenser 34 will be increased to be extremely high. Therefore, to prevent this, a constant voltage diode Z is incorporated in the short circuit 32 for the purpose of bypassing the current and apparently increasing the consumed current upon exceeding a limit voltage.

In order to make lower a minimum limit of the primary current in which the constant voltage regulator 36 can output a predetermined voltage, it is preferable that a rating of the output current from the current transformer 1 is elevated. However, note that, in such a case, a maximum limit of the primary current also comes to be lower. Therefore, it is essential to select a value of the rating capable of appropriately covering an operating range.

In the invention, it is possible to secure a power supply for the detecting device, a measuring instrument or the like in the proximity of various electrical equipment facilities to be watched, thereby making it possible to reduce considerably an amount of laying the power supply cable.

Furthermore, even in any electrical equipment such as electric motor of which current level largely varies and in which, at the time of starting, a large amount of current flows ranging from several to ten-odd times as large as that in a normal state, a stable constant voltage can be obtained.

Embodiment 2

Figure 5:
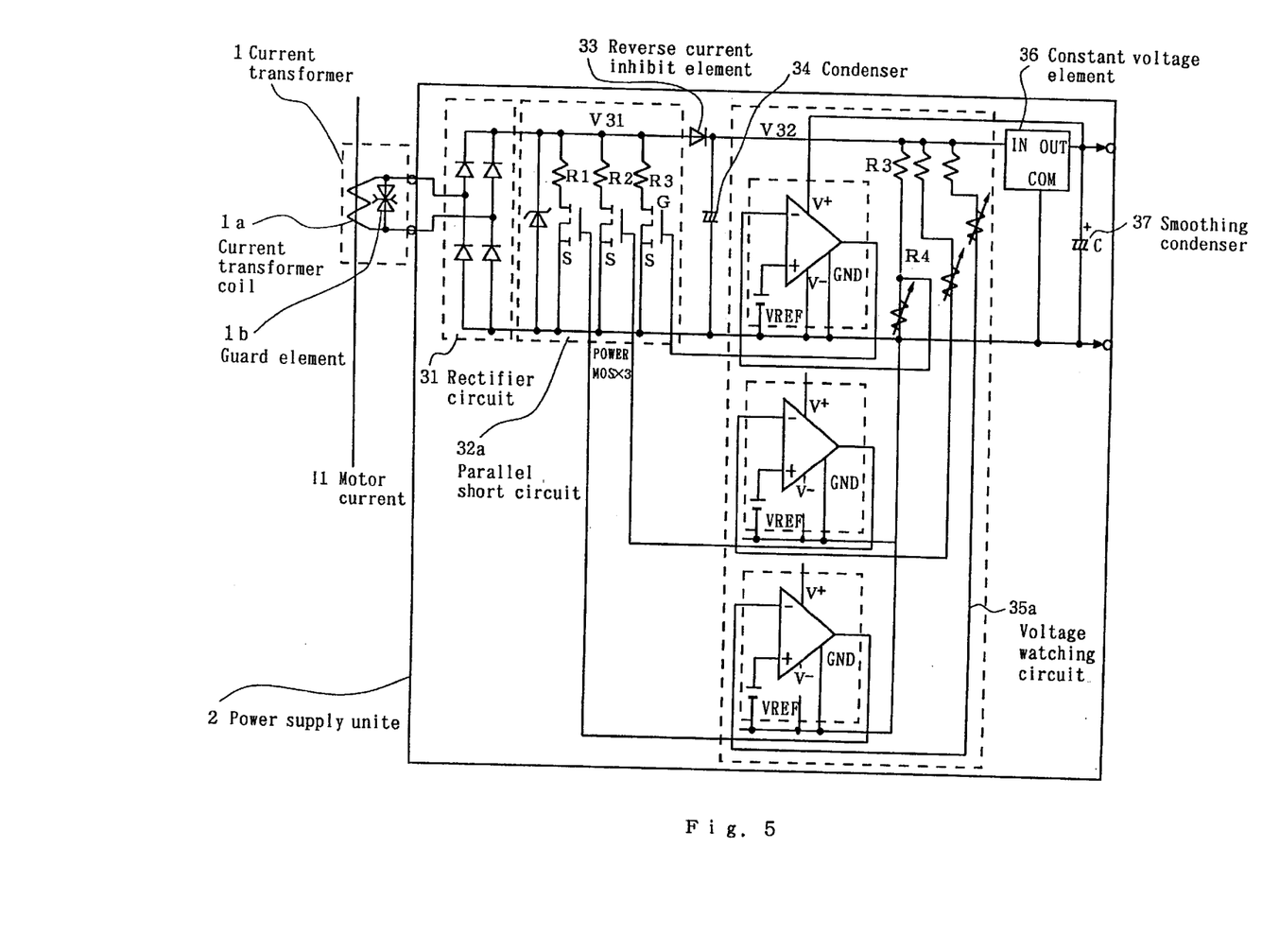
FIG. 5 is a circuit diagram of a power supply unit according to a second embodiment.

FIG. 5 shows an arrangement of the power supply unit according to a second embodiment of the invention.

In the foregoing first embodiment, a maximum value of the primary current is affected due to a current capacity of the element forming the short circuit 32. Therefore, in order to further apply the circuit up to a region, of large current, the short circuit 32 is provided with short-circuits in parallel forming a parallel short circuit 32a (switching circuits connected in parallel) shown in FIG. 5. Further in order to cause each of the parallel short circuits 32a to sequentially operate as the primary current elevates, a plurality of voltage watching circuits 35 are provided and their values of the voltage V32 for outputting a command signal are made different respectively. As a result, coverage can be enlarged.

In FIG. 5, there are differences from the first embodiment in the aspect that the parallel short circuits 32a are utilized and that a plurality of the voltage watching circuits 35a as many as the parallel short circuits 32a and different in voltage for actuation from each other, are utilized.

Operation of the second embodiment is now described referring to the drawings. However, further description about the same parts as that of the foregoing first embodiment is omitted.

When the voltage of the condenser 34 having stored a rectified power rises and comes to a predetermined voltage, one element of the parallel short circuits 32a is short-circuited. The short circuit is established via a resistance R1 connected in series to the element. Thus, when the primary current further increases, the voltage V31 of the rectifier circuit 31 increases and approaches again to an allowable maximum limit value of the constant value element 36. In FIG. 5, before this, the other elements of the parallel short circuits 32a are brought into conduction, and the voltage build-up rate of the voltages V31 and V32 is restrained by arranging resistances R1 and R2 in parallel. Further increase in number of the short circuits in parallel makes it possible to apply to a wider range of the primary current. In addition, it is necessary to set a resistance at the time of short circuit to be such that value of the parallel resistance during operation is not more than load impedance of the power supply.

Figure 6:
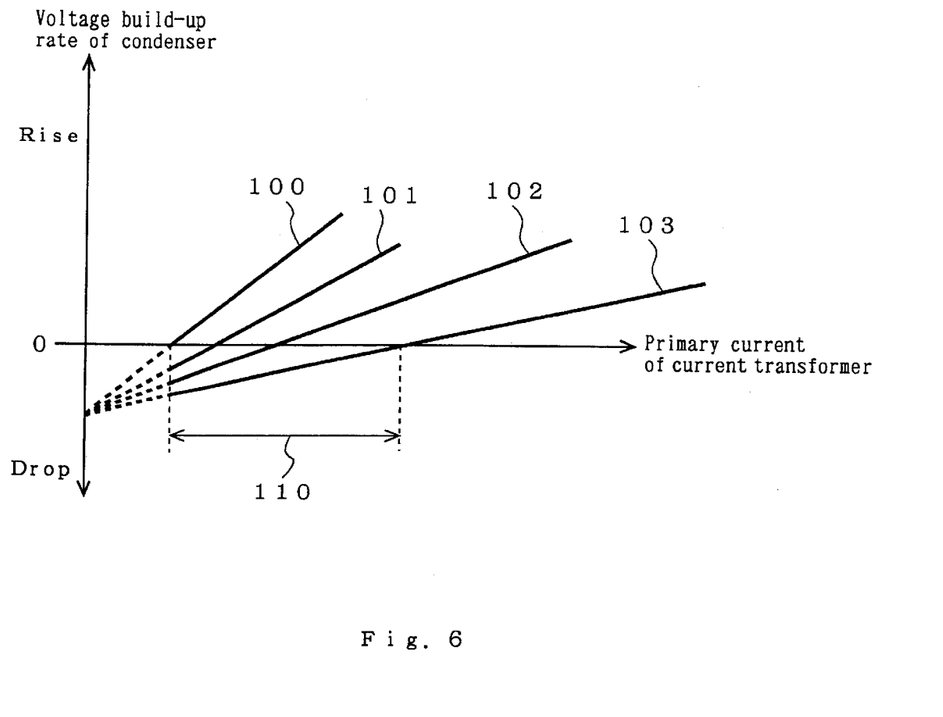
FIG. 6 is a characteristic chart for explaining an operation of FIG. 5.

For easy understanding, FIG. 6 shows change in voltage build-up rate at both terminals of the condenser 34 with respect to a value of the primary current. In the drawing, numeral 100 indicates a characteristic of the voltage build-up rate of the condenser 34 when the short circuit is not operated at all. Numeral 101 shows the characteristic when one of the short circuits is operated. Numeral 102 shows the characteristic when two short circuits are operated, and numeral 103 shows the characteristic when three short circuits are operated. However, in FIG. 6, for convenience of explanation, a value of current consumed at the controller, etc. is supposed to be constant. Note that the primary current of this power supply unit can operate within a range (indicated by numeral 100 in the drawing) in which the voltage build-up rate of the condenser 34 is plus (positive region) under the condition that the parallel short circuit 32a is not operated at all (solid line 100 in the drawing), and the voltage build-up rate of the condenser 34 is minus (negative region indicated by 110 in the drawing) under the condition that the short circuit 32 is operated (solid line 101, 102, 103).

It is an advantage of this embodiment that an applicable range of the primary current of electric motor or the like can be enlarged.

Embodiment 3

Figure 7:
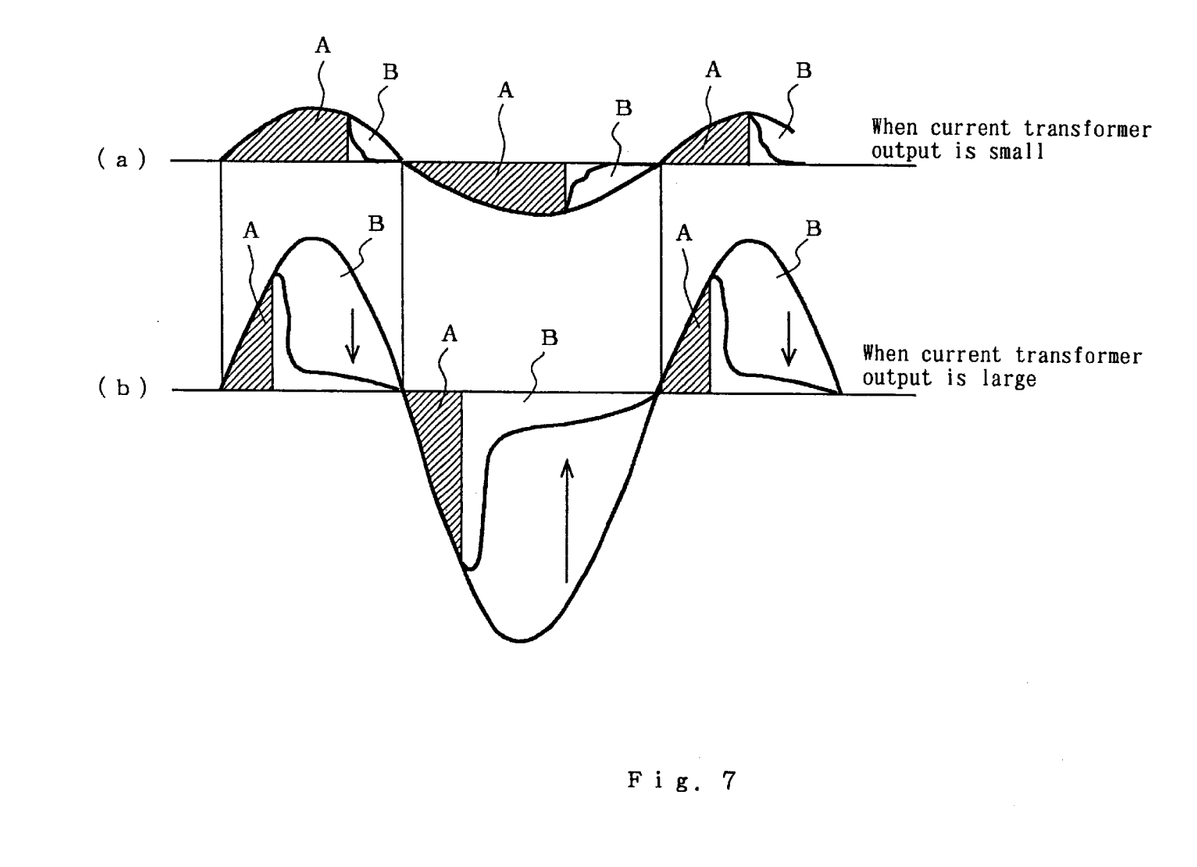
FIG. 7 is a waveform chart explaining a characteristic of a current transformer in a power supply unit according to a third embodiment.

FIG. 7 shows another preferred embodiment according to the invention.

In the foregoing second embodiment, enlargement of a range of the primary current capable of obtaining an appropriate output voltage is achieved by arranging the resistances R1 to R3 of the short circuits in parallel. Alternatively, it is also preferable that reducing the output current itself from the current transformer 1 as the primary current increases enlarges applicable range of the primary current.

Referring to FIG. 7, a current transformer 1 is arranged so that material and configuration of a core thereof possesses a hysteresis characteristic of a strong tendency to be saturated (saturable reactor in the invention). Accordingly, when the primary current is small, like a region A indicated in FIG. 7(a), an output from the current transformer is obtained in most regions of the power supply cycle. Meanwhile, as the primary current becomes larger, a magnetic characteristic of the current transformer 1 enters a saturated region at an initial point of each cycle. Thus, a region B where there is substantially no power supply to the condenser 34 increases and then the secondary output current does not substantially increase, thereby making it possible to prevent over voltage in the range of large primary current.

An advantage of using the current transformer possessing characteristics shown in FIG. 7 is such that even if a power supply is obtained from any electrical equipment such as electric motor having a great range of variation in current value, a stable voltage can be obtained with respect to the wide range of variation in current value.

Embodiment 4

Figure 8:
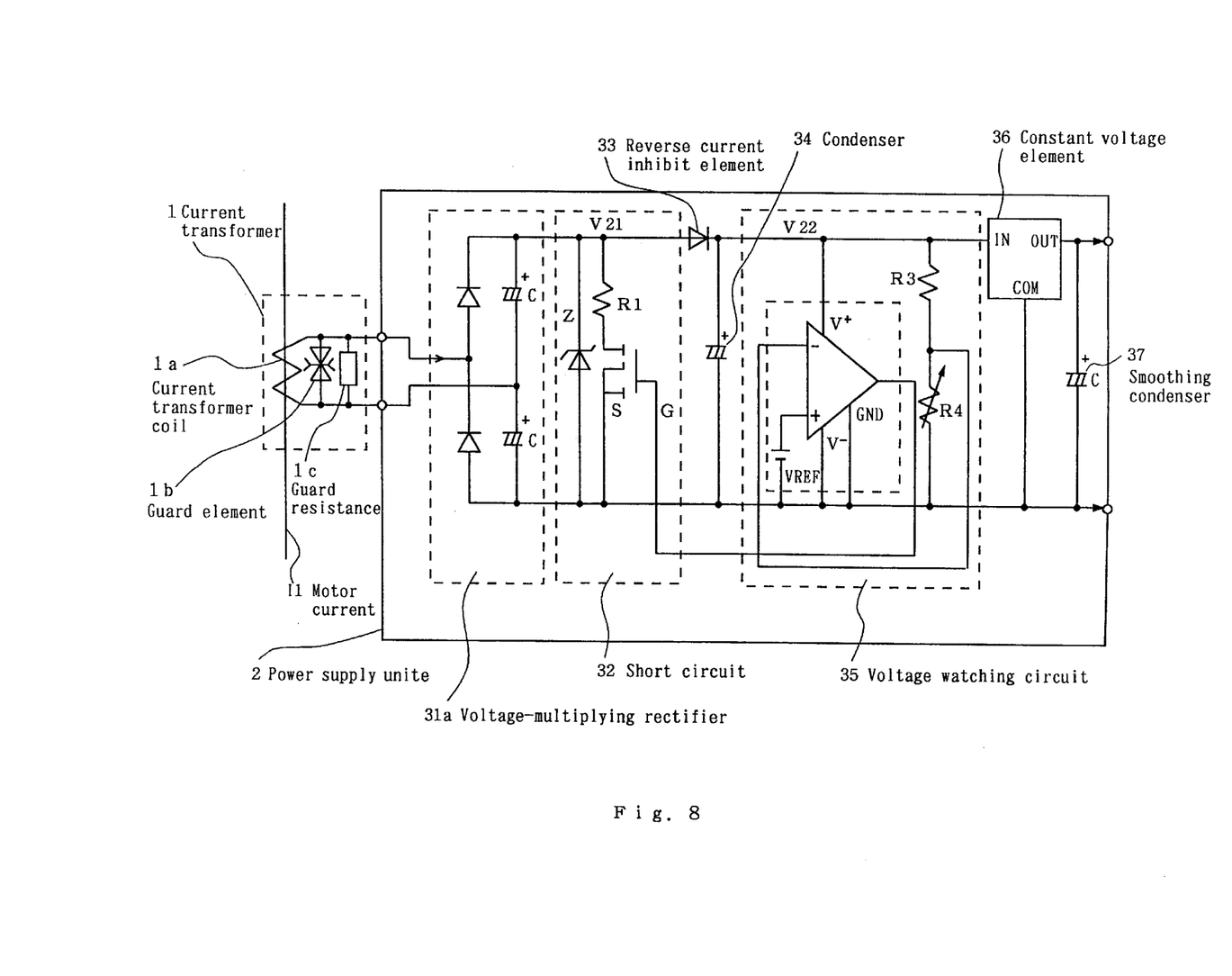
FIG. 8 is a circuit diagram of a power supply unit according to a fourth embodiment.

FIG. 8 shows a non-contact power supply unit according to a fourth preferred embodiment of the invention.

In actual plant, it is possible that an insulation breakdown accident may occur in the current transformer 1 due to break on the secondary wiring of the current transformer 1. Therefore, to prevent such a trouble, it is sometime desirable to connect a guard resistance 1C at an output terminal of the secondary winding as shown in FIG. 8.

In this case, in the full-wave rectifier circuit 31 according to the foregoing first embodiment shown in FIG. 2, when the primary current of the electric motor is small, the voltage V31 after rectification will be short. Considering a forward voltage drop in the reverse current inhibit element 33, the constant voltage element 36 is not supplied with a sufficient voltage, thereby making it impossible to obtain any constant target voltage.

To cope with such a problem, it is preferable that the rectifier circuit is comprised of a rectifier circuit capable of obtaining a high voltage such as voltage-multiplying rectifier 31a, voltage-triplying rectifier or Cockcroft-Walton type rectifier. Any of these rectifier circuits are well known and therefore detailed description thereof is omitted. In FIG. 8, numeral 31a indicates the case of employing a voltage-multiplying rectifier. Parts other than the rectifier circuit are of the same arrangement as-those in FIG. 2.

In the circuit of FIG. 8, the range of the primary current of the electric motor capable of obtaining a target voltage can be expanded to a range of smaller current.

What is claimed is:

1. A power supply unit comprising:
   a current transformer mounted on a power supply line of an electrical equipment;
   a rectifier circuit connected to an output side of said current transformer;
   a condenser connected at a first terminal via a reverse current inhibiting element to an output terminal of said rectifier circuit and receiving an output current from said current transformer;
   a voltage watching circuit for outputting a command signal when a voltage across said condenser exceeds a first voltage, and for stopping the command signal when the voltage across said condenser is below a second voltage; and
   a switching circuit for connecting a resistor to the output terminal of said rectifier circuit, in response to the command signal, thereby reducing current for charging said condenser.

2. The power supply unit according to claim 1 further comprising a constant voltage regulator for obtaining a constant voltage output across said condenser.

3. The power supply unit according to claim 1, comprising a plurality of said switching circuits and a plurality of said voltage watching circuits, respectively, and wherein the first voltage set at each of said plurality of voltage watching circuits is different for each of said plurality of voltage watching circuits.

4. The power supply unit according to claim 1, wherein said current transformer includes a core surrounding the power supply line and a secondary winding wound around said core.

5. The power supply unit according to claim 4, wherein said core includes a saturable reactor magnetically saturated in each cycle of a primary current of said current transformer.

6. The power supply unit according to claim 4, further comprising a resistor connected in parallel with a secondary winding of said current transformer, and wherein said rectifier circuit is one of a voltage multiplying rectifier and a Cockcroft-Walton step up circuit.

7. The power supply unit according to claim 2, wherein the first voltage is close to a maximum voltage at which said constant voltage regulator can be operated, and the second voltage is close to a minimum voltage at which said constant voltage regulator can be operated.

* * * * *